United States Patent
Hsu et al.

(10) Patent No.: US 7,920,216 B2
(45) Date of Patent: Apr. 5, 2011

(54) STEREO IMAGE DISPLAY WITH SWITCH FUNCTION BETWEEN HORIZONTAL DISPLAY AND VERTICAL DISPLAY

(75) Inventors: Wei-Liang Hsu, Taipei (TW); Chao-Hsu Tsai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 65 days.

(21) Appl. No.: 12/121,802

(22) Filed: May 16, 2008

(65) Prior Publication Data
US 2009/0167968 A1 Jul. 2, 2009

(30) Foreign Application Priority Data
Dec. 31, 2007 (TW) ............................ 96151553 A

(51) Int. Cl.
G02F 1/1335 (2006.01)
H04N 13/04 (2006.01)
(52) U.S. Cl. .......................................... 349/15; 348/51
(58) Field of Classification Search .............. 349/15, 349/42–60, 201, 202; 348/42–60
See application file for complete search history.

(56) References Cited

U.S. PATENT DOCUMENTS

| 725,567 | A | 4/1903 | Ives |
| 7,116,387 | B2 | 10/2006 | Tsai et al. |
| 2006/0227256 | A1* | 10/2006 | Hamagishi et al. ............. 349/15 |
| 2006/0233970 | A1* | 10/2006 | Takahashi et al. ............. 428/1.1 |

* cited by examiner

*Primary Examiner* — Mark A Robinson
*Assistant Examiner* — Paul C Lee
(74) *Attorney, Agent, or Firm* — Jianq Chyun IP Office

(57) ABSTRACT

A stereo image display, switching between a first display direction and a second display direction, includes a polarized light module for providing a polarized light. A first light grating unit is implemented on the light path of the polarized light. When the first light grating unit is activated, the polarized light is modulated to output light in every two column; and when it is turned off, all the polarized light substantially passes. A second grating unit is implemented on the light path of the polarized light. When the second light grating unit is activated, the polarized light is modulated to output light in every two row; and when it is turned off, all the polarized light substantially passes. By the light passing the light grating units, an image displaying unit displays a first image at odd columns or rows and a second image at even columns or rows.

16 Claims, 11 Drawing Sheets

STEREO IMAGE DISPLAY WITH SWITCH FUNCTION BETWEEN HORIZONTAL DISPLAY AND VERTICAL DISPLAY

CROSS-REFERENCE TO RELATED APPLICATION

This application claims the priority benefit of Taiwan application serial no. 96151553, filed on Dec. 31, 2007. The entirety of the above-mentioned patent application is hereby incorporated by reference herein and made a part of specification.

BACKGROUND OF THE INVENTION

1. Field of the Invention

The present invention relates to a stereo image display technique, by which 2D or 3D image display may be switched in two display directions.

2. Description of Related Art

FIG. 1 is a cross-sectional view of a device provided by U.S. Pat. No. 7,255,671,903. As shown in FIG. 1, a backlight plate 100 provides a light source to a parallax barrier 101, wherein the parallax barrier 101 has transparent and opaque interlaced vertical strips for outputting light in interlaced strips, and in coordination with pixels within a transmissive display unit 102 and a position of human eyes. A first eye of an observer may observe a first image, and a second eye may observe a second image, such that a stereo display effect of 3D images separation for the left eye and the right eye is then achieved. As shown in FIG. 1, the left eye may only observe the pixels in odd columns 01, 03, 05, 07 and 09, and cannot observe the pixels in even columns; meanwhile, the right eye may only observe the pixels in the even columns 02, 04, 06, 08 and 10, and cannot observe the pixels in the odd columns, so as to form a stereo image in a vision system.

FIG. 2 is a diagram illustrating another conventional technique. A structural difference between the embodiments of FIG. 1 and FIG. 2 is that positions of the parallax barrier 101 and the transmissive display unit 102 are exchanged. In other words, in FIG. 1, the transmissive display unit 102 is disposed on the same side of the backlight plate 100 and the parallax barrier 101, while in FIG. 2, the transmissive display unit 102 is disposed between the backlight plate 100 and the parallax barrier 101. The effect achieved by the embodiment of FIG. 2 is the same to that of FIG. 1.

Another conventional technique is disclosed by U.S. Pat. No. 7,116,387. As shown in FIG. 3A and FIG. 3B, two pieces of microretarder plates 2 and 3 with vertical interlaced 0 wavelength and λ/2 wavelength retardation are provided, and based on relative horizontal movement of the two plates, two states of with parallax barrier and without parallax barrier may be switched, so as to switch between a 2D image display and a 3D image display. With coordination of the microretarder plate and a polarizing plate, switching between 2D and 3D image display then may be achieved based on movement of the microretarder plate. Moreover, a transmissive liquid crystal panel 1, two microretarder plates 2 and 3, a polarizing plate 4, a backlight module 5, two drivers 6 and 7 and a carrier 8 are illustrated in FIG. 3A and FIG. 3B.

A planar image output mode is illustrated in FIG. 3A, in which when retardation patterns of the two microretarder plates 2 and 3 are overlapped, polarized light may substantially pass through, and the display unit 1 then displays a planar image. Moreover, a stereo image output mode is illustrated in FIG. 3B, in which when allocation of the retardation patterns of the two microretarder plates 2 and 3 are interlaced, striped intervals with 0 and λ/2 wavelength retardation are generated, such that the light is output in interlaced strips. Therefore, the display unit 1 then displays a stereo image, and accordingly 2D and 3D display modes may be switched.

However, the conventional display structures may only have the 3D display effect in one display direction, for example the horizontal direction, and therefore application thereof is limited.

SUMMARY OF THE INVENTION

The present invention is directed to a stereo image display device, which may be switched between a first display direction and a second display direction, and may have a 3D display effect in both display directions according to selection control of a user.

The present invention provides a stereo image display device including a polarized light source module, a first light grating unit, a second light grating unit and an image display unit. The polarized light source module is used for providing a polarized light. The first light grating unit is disposed on a light path of the polarized light, wherein when the first light grating unit is activated, the polarized light is modulated to form a first grating light source outputting light in every two columns in a first display direction, and when it is turned off, all the polarized light substantially passes through. The second light grating unit is disposed on the light path of the polarized light, and when the second light grating unit is activated, the polarized light is modulated to form a second grating light source outputting light in every two rows in a second display direction, and when it is turned off, all the polarized light substantially passes through. When the first light grating unit generates the first grating light source, the second light grating unit is controlled to remain a state of the first grating light source. The image display unit displays a first image at odd columns or rows of pixels and a second image at even columns or rows of pixels based on the light output from the light grating units.

The present invention provides another stereo image display device including a polarized light source module, a display unit, a first light grating unit and a second light grating unit. The polarized light source module is used for providing a polarized light source. The display unit is used for displaying a 2D or 3D first image corresponding to a first display direction, or displaying a 2D or 3D second image corresponding to a second display direction. The first light grating unit is disposed between the polarized light source module and the display unit, wherein the first light grating unit includes a first liquid crystal plate for modulating the 3D first image in the first display direction corresponding to a first state, or modulating the 2D first image corresponding to a second state. The second light grating unit is disposed between the polarized light source module and the display unit, wherein the second light grating unit includes a second liquid crystal plate for modulating a polarization state of the polarized light corresponding to the 3D second image in the second display direction, or modulating the polarization state of the polarized light corresponding to the 2D second image. When the first image of the first light grating unit is the 3D image, the second light grating unit is controlled to maintain a grating light source with a desired state.

The present invention provides still another stereo image display device including a polarized light source module, a first light grating unit, a second light grating unit and an image display unit. The polarized light source is used for providing a polarized light source. The first light grating unit is disposed on a light path of the polarized light for modulating the polarized light to form a first light grating light source outputting light in every two columns. The second light grating unit is disposed on a light path of the polarized light for modulating the polarized light to form a second light grating light source outputting light in every two rows, wherein the second light grating light source may be turned off to allow outputting with the first grating light source. The image display unit is used for displaying a first image at odd columns of pixels and a second image at even columns of the pixels corresponding to the first light grating unit, and displaying a third image at odd rows of pixels and a fourth image at even rows of the pixels corresponding to the second light grating unit.

In order to make the aforementioned and other objects, features and advantages of the present invention comprehensible, a preferred embodiment accompanied with figures is described in detail below.

DESCRIPTION OF EMBODIMENTS

In application of display devices, disposition angles and methods of the display devices may be different according to different requirements. For example, when a digital photo frame displays a horizontal or a straight photo, straight or horizontal disposition of the digital photo frame is generally determined. As to medical images, the medical images captured by different capturing devices may be the horizontal or straight images, and therefore disposition of the corresponding display device may be switched to be horizontal or straight. However, as to a present 3D display device, designed display directions are all horizontal, and if the 3D display device is disposed straight, 3D effect thereof is then no more exist. According to a display technique provided by the present invention, a 3D screen may be adjusted according to different disposition methods, such that utilization of the 3D screen is relatively not limited by the disposition method thereof. Moreover, according to the display technique of the present invention, a 2D display effect is compatible, and therefore such screen may be switched among planar image mode/vertical stereo image mode/horizontal stereo image mode, and is convenient for users.

Figure 1:
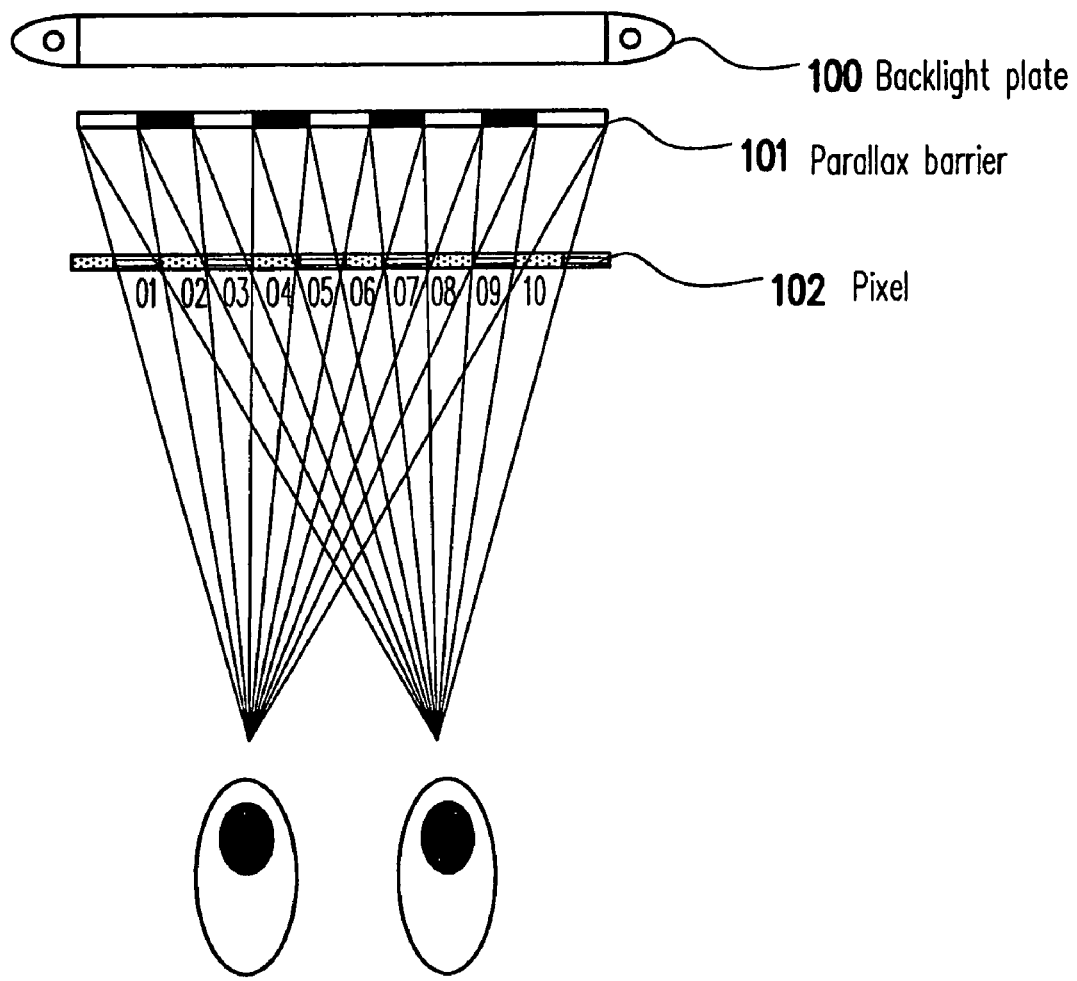
FIG. 1 is a schematic diagram illustrating a conventional stereo image display mechanism applying a parallax barrier.
Figure 2:
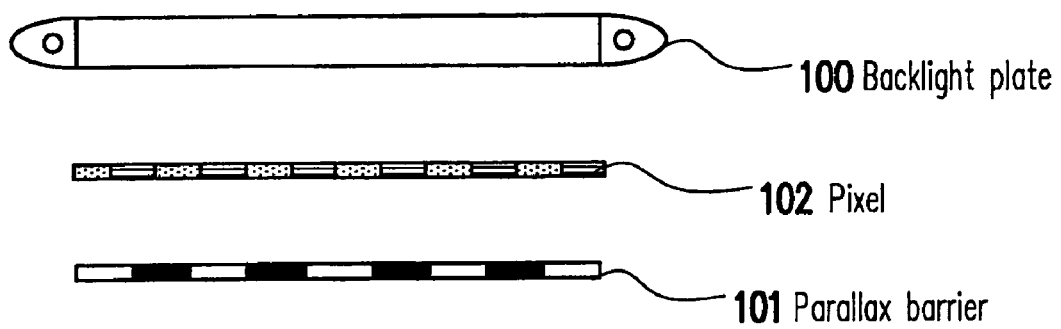
FIG. 2 is a schematic diagram illustrating another conventional stereo image display mechanism.
Figure 3A:
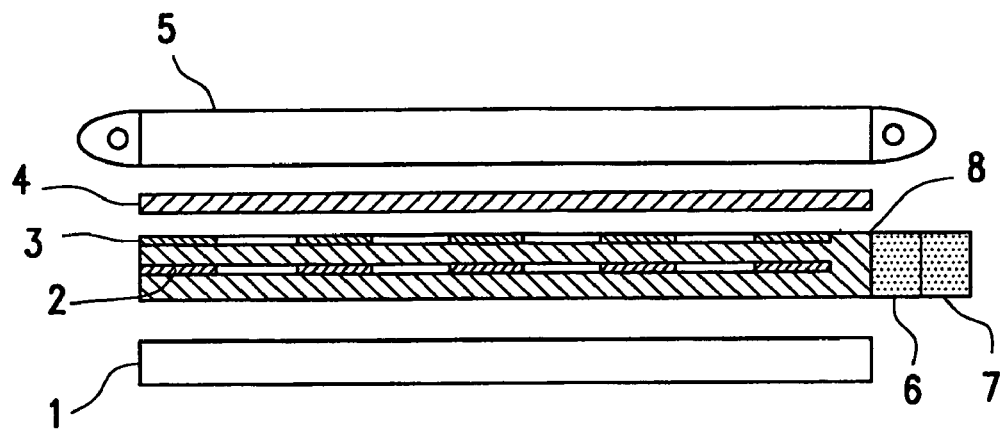
FIGS. 3A-3B are schematic diagrams illustrating another conventional stereo image display mechanism in which 2D and 3D image display may be switched.
Figure 3B:
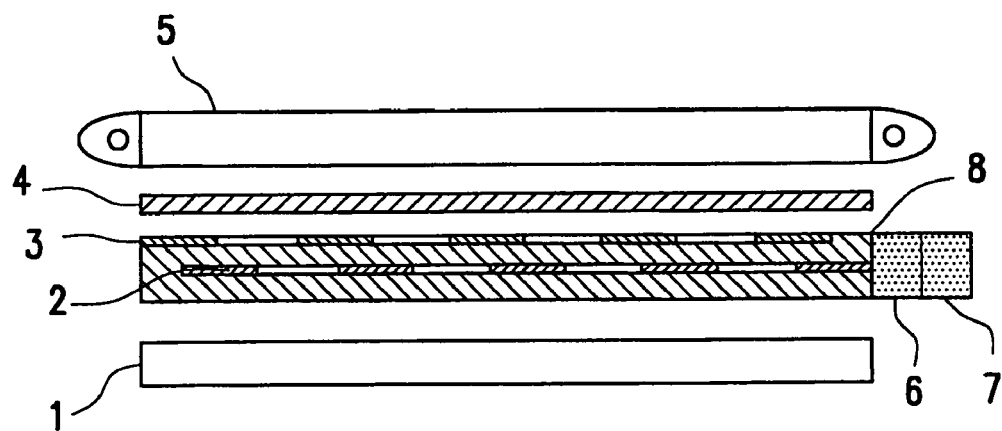
Figure 4A:
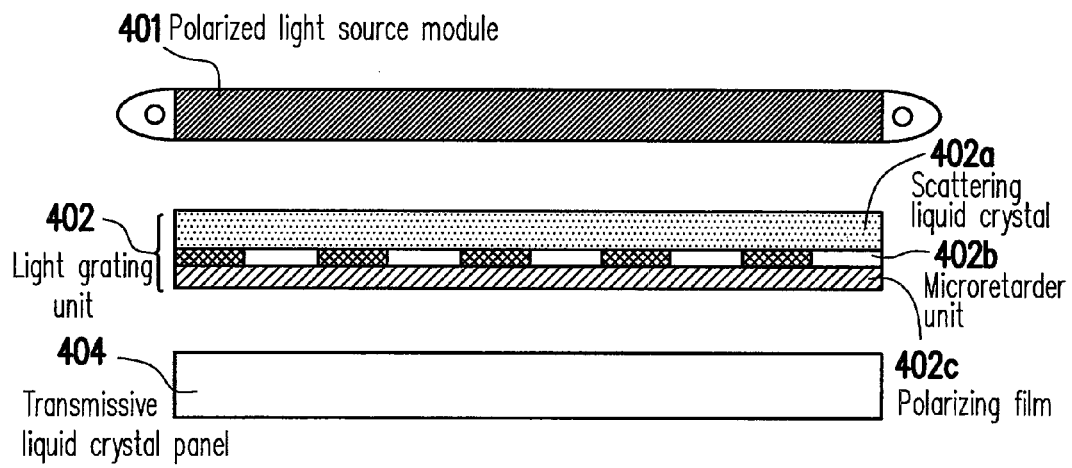
FIGS. 4A-4B are structural cross-sectional views of a stereo image display device according to an embodiment of the present invention.
Figure 4B:
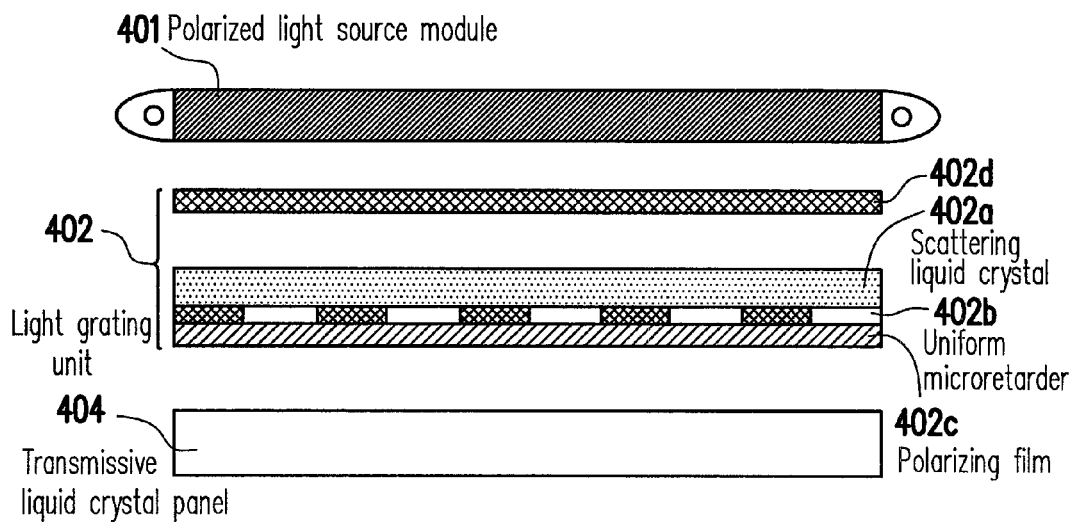

FIG. 4A is a structural cross-sectional view of a stereo image display device displaying in a horizontal direction according to an embodiment of the present invention. Referring to FIG. 4A, setting and mechanism for generating a 3D image in the horizontal display direction is first described. A polarized light source module 401 is applied for providing a light source which may provide light with a same polarizing feature. The polarized light passes through a light grating unit 402 to form a strip interlaced light, and then reaches an image display device 404 to form a first image at odd columns of pixels for sending to a first eye of an observer, and form a second image at even columns of pixels for sending to a second eye of the observer, so as to form a stereo image. Alternatively in FIG. 4B, a uniform microretarder unit 402d with a stretching direction substantially perpendicular to that of the microretarder unit, and disposed between the polarized light source module and the microretarder unit.

The light grating unit 402 is composed of a scattering liquid crystal unit 402a, a microretarder unit 402b and a polarizing film 402c. The scattering liquid crystal unit 402a functions as a polarized light modulation unit for modulating polarization of the polarized light passed through. The scattering liquid crystal unit 402a has a controllable transparent state and a scattering state. When the scattering liquid crystal unit 402a is switched to the transparent state, the polarized light with the original polarization is allowed to pass through, and when scattering liquid crystal unit 402a is switched to the scattering state, the polarized light is then scattered, and the original polarization of the polarized light is lost, such that non polarized light passes through the scattering liquid crystal unit 402a.

If polarization direction of the polarized light source module is the same to that of the polarizing film, when the generated polarized light passes through the strip region with λ/2 retardation of the microretarder unit, the polarized light is rotated for 90 degrees, and cannot pass through the polarizing film 402c, such that an opaque area is formed. Meanwhile, when the polarized light passes through the strip region with 0 retardation, the polarized light may pass through the polarizing film due to same phases thereof, such that a transparent area is formed, and the light is then output in strips in every two columns, so as to form the stereo image. The same polarized light generated from the polarized light source module 401 enters the light grating unit 402, and now the scattering liquid crystal unit 402a is controlled to scatter the polarization of the input light to form the non-polarized light. Base on phase distribution of the microretarder unit, such non-polarized light may have no effective optical function in overview. Therefore, the light grating unit 402 does not form a parallax grating, which is referring to as a turned off state. Otherwise, the light grating unit 402 is in a turned on state and forms the parallax grating. When the light grating unit 402 is turned off, a mono polarized light is allowed to pass through the polarizing film 402c, and after processing by the image display device, the mono polarized light enters eyes of the observer, and now the observer may view a planar image.

Figure 5:
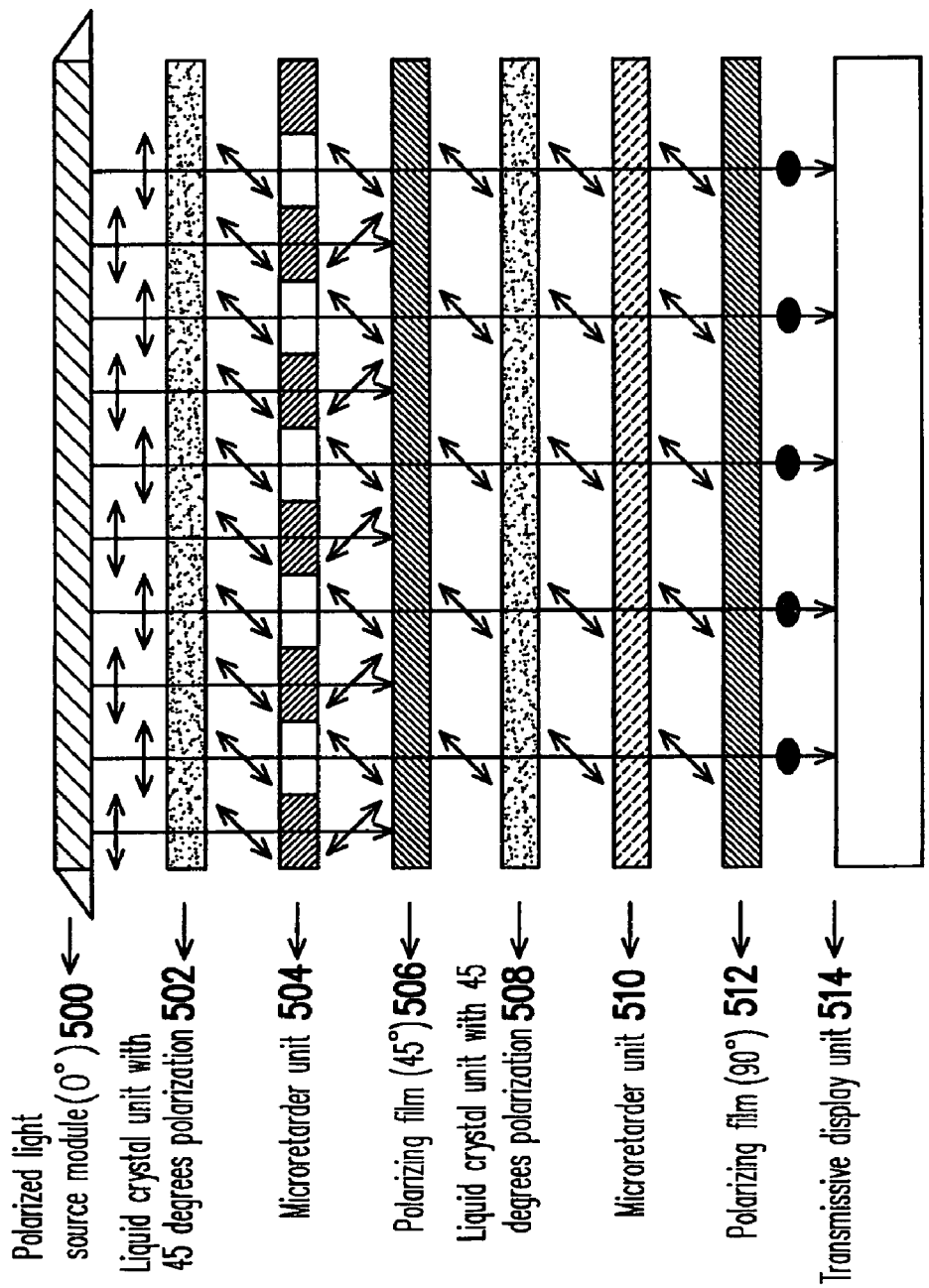
FIG. 5 is a cross-sectional view of a stereo image display device displaying in a horizontal direction according to an embodiment of the present invention.

Next, based on function of the microretarder unit of the light grating unit, an embodiment is provided, by which the 3D image may be displayed in two display directions. FIG. 5 is a cross-sectional view of a stereo image display device displaying in a horizontal direction according to an embodiment of the present invention. Referring to FIG. 5, arrow directions represent polarization directions of the light. The stereo image display device may include a polarized light source module 500, a first light grating unit (502+504+506), a second grating unit (508+510+512) and an image display unit. The polarized light source module 500 is used for providing a polarized light. The first light grating unit is disposed on a light path of the polarized light, wherein when the first light grating unit is activated, the polarized light is modulated to form a first grating light source outputting light in every two columns in a first display direction; and when it is turned off, all the polarized light substantially passes through. The second light grating unit is disposed on the light path of the polarized light, wherein when the second light grating unit is activated, the polarized light is modulated to form a second grating light source outputting light in every two rows in a second display direction, and when it is turned off, all the polarized light substantially passes through. As shown in FIG. 5, the second light grating unit (508+510+512) is turned off. The image display unit may be a transmissive display unit 514, which may display a first image at odd columns or rows of pixels and a second image at even columns or rows of pixels based on the light output from the light grating units, wherein the image displayed in the columns is the horizontal image displayed when the display device is disposed horizontally, and the image displayed in the rows is the straight image displayed when the display device is disposed straight.

Figure 6:
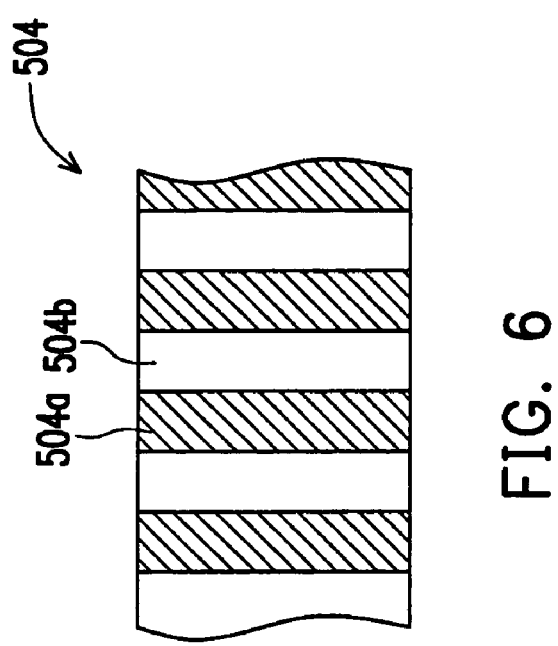
FIG. 6 is a schematic diagram illustrating a strip structure of a microretarder unit according to an embodiment of the present invention.

For example, when the 3D image is displayed in the horizontal direction, the polarized light source module 500 provides a light source which may provides 0 degree polarized light as shown in FIG. 5. In the following description, polarized light with an initial state of 0 degree is taken as an example, though the present embodiment is not limited thereto, the polarized light with the initial state of 90 degrees may also be applied. After the polarized light passes through an activated liquid crystal unit 502 with 45 degree polarization rotation, the polarized light is polarized to 45 degrees and then transmitted to a microretarder unit 504 with a fast axis (or a slow axis) thereof disposing in 0 degree. The microretarder unit 504 has different retardations in the horizontal direction, i.e. has vertical strip interlaced patterns with 0 wavelength retardation and $\lambda/2$ wavelength retardation as shown in FIG. 6. After the 45 degree polarized light passes through the microretarder unit 504, the odd strips are changed to 135 degree polarized light, and the even strips remain 45 degree polarized light. Thereafter, the polarized light is transmitted to a 45 degree polarizing film 506, wherein the 135 degree polarized light cannot pass through the polarizing film 506, so as to form a grating light source. Polarized light emitted from such grating light source passes through a second turned off liquid crystal unit 508 with 45 degree polarization, and polarization state thereof is not changed.

Next, since direction of the fast axis of a microretarder unit 510 has 45 degrees difference with that of the microretarder unit 504, which is disposed in 45 degrees as that shown in FIG. 5, polarization state of the polarized light passed through the microretarder unit 510 is not changed and maintains 45 degrees. However, since a polarizing film 512 is disposed in 90 degrees, a part of the 45 degree polarized light may still passes through the polarizing film 512. Light emitted from the grating light source maintains a same grating state and is transmitted to the liquid crystal image display unit. Therefore, the first image displayed at odd columns of pixels is transmitted to the first eye of the observer, and the second image displayed at even columns of pixels is transmitted to the second eye of the observer, so as to form the stereo image in the horizontal direction.

FIG. 6 is a schematic diagram illustrating a strip structure of a microretarder unit according to an embodiment of the present invention. The microretarder unit 506 has a plurality of interlaced first strip areas 504a and a plurality of interlaced second strip areas 504b. Wherein, the first area 504a has a stretching structure for implementing the $\lambda/2$ retardation, and the second area 504b does not have the stretching structure, and therefore retardation difference of the first area 504a and the second area 504b is $\lambda/2$. Certainly, the first area 504a and the second area 504b may be exchanged according to an actual requirement. The polarization of light passes through the first area 504a rotate for 90 degrees for being perpendicular to the polarization of the second area 504b. Actually, as long as a total retardation difference between the first area and the second area of the microretarder unit 504 reaches $\lambda/2$, the structure is applicable. The first area 504a and the second area 504b may simultaneously have the retardant structure.

Figure 7:
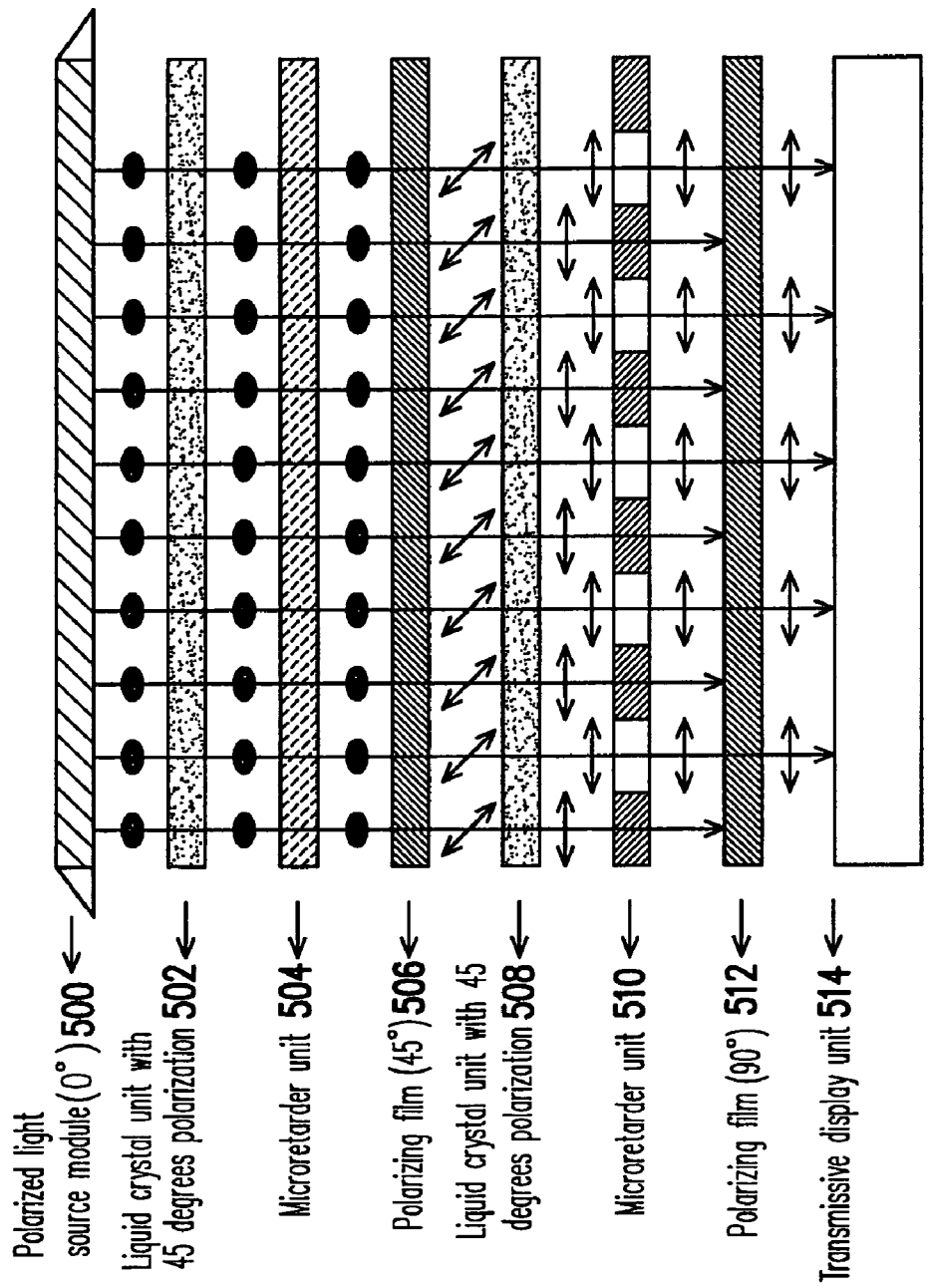
FIG. 7 is a cross-sectional view of a stereo image display device displaying in a vertical direction according to an embodiment of the present invention.

FIG. 7 is a cross-sectional view of a stereo image display device displaying in a vertical direction according to an embodiment of the present invention. The structure shown in FIG. 7 is the same to that shown in FIG. 5, though FIG. 7 is a cross-sectional view in the vertical direction for explaining the display mechanism when the display device is disposed straight. Referring to FIG. 7, the polarized light source module 500 provides a light source which may provides 0 degree polarized light, though the 0 degree polarized light is perpendicular to the drawing paper. After passing through the turned off first liquid crystal unit 502 with 45 degree polarization rotation, the polarized light maintains the 0 degree polarization state, and then the polarized light passes through the microretarder unit 504 with the 0 degree retardation and the $\lambda/2$ retardation and the polarizing film 506 disposed in 45 degrees. In FIG. 7, the fast axis of the microretarder unit 504 is disposed in 0 degree, and therefore the polarized light is maintained with the 0 degree polarization state. The polarized light is polarized to 45 degrees after passing through the polarizing film 506, and then the polarized light is again polarized to 90 degrees after passing through the activated second liquid crystal unit 508 with 45 degree polarization rotation. Thereafter, the polarized light is transmitted to the microretarder unit 510, wherein the microretarder unit 510 has different retardations in the vertical direction, i.e. has horizontal strip interlaced patterns with 0 wavelength retardation and $\lambda/2$ wavelength retardation. The 90 degree polarized light maintains the 90 degree polarization after passing through the strips with 0 wavelength retardation and reaches the polarizing film 512 disposed in 90 degrees. Thereafter, the polarized light continually passes through the polarizing film 512 and reaches the transmissive display unit 514. Moreover, the polarized light passing through the strips with $\lambda/2$ wavelength retardation again rotate 90 degrees to form the 0 degree polarized light. Since there are 90 degree phase difference between the 0 degree polarized light and the polarizing film 512, the 0 degree polarized light cannot pass through the polarizing film 512, such that a grating light source is formed. Therefore, the first image displayed at odd rows of pixels is transmitted to the first eye of the observer, and the second image displayed at even rows of pixels is transmitted to the second eye of the observer, so as to form the stereo image in the vertical direction.

Figure 8:
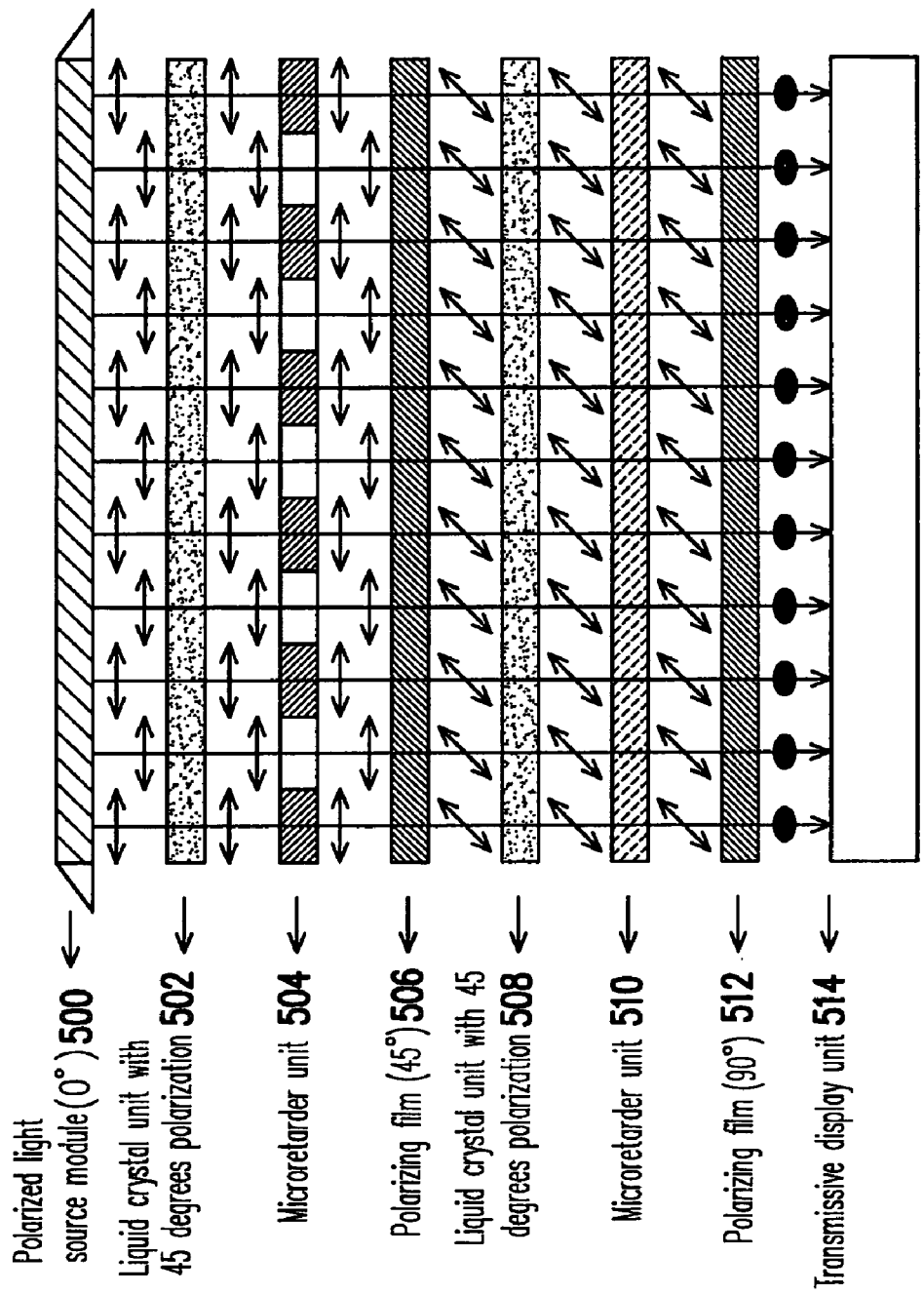
FIG. 8 is a schematic diagram illustrating a 2D image display mechanism according to an embodiment of the present invention.

The aforementioned mechanism is for the 3D image display, however, if operation mechanism of the light grating unit is different, display mechanism thereof is also different, so as to achieve the grating light source effect. In the following content, switching of the 2D image display mechanism is first described. FIG. 8 is a schematic diagram illustrating a 2D image display mechanism according to an embodiment of the present invention. Referring to FIG. 8, 2D image display may be achieved with the same components shown in FIG. 5 under a different operation. The polarized light source module 500 provides a light source which may provides 0 degree polarized light. Now, the liquid crystal unit 502 with 45 degree polarization rotation is turned off, and therefore the polarized light is maintained with 0 degree polarization. Next, the 0 degree polarized light passes through the microretarder unit 504, and since the fast axis thereof is disposed in 0 degree, the polarized light is maintained to the 0 degree polarization state. Since polarization direction of the incident light is also 0 degree, an angle between the direction of the fast axis of the microretarder unit 504 and the polarization direction of the incident light is also 0 degree. The microretarder unit 504 is used for double rotating the angle, and since the angle is 0, there is no actual rotation thereof. Therefore, the polarization direction of the polarized light after passing through the microretarder unit 504 is still maintained to 0 degree. Next, after passing through the 45 degree polarizing film 506, the light is polarized for 45 degrees. Such 45 degree polarized light maintains the same polarization state after passing through the turned off second liquid crystal unit 508 with 45 degree polarization rotation. Next, the 45 degree polarized light passes through the microretarder unit 510, and since the fast axis of the microretarder 510 is disposed in 45 degrees, polarization state of the polarized light is still maintained to 45 degrees. Thereafter, the polarized light passes through the 90 degree polarizing film 512 and forms the 90 degree polarized light. Besides the polarized light is polarized to 90 degrees, a planar light source is maintained to be provided to the liquid crystal image display unit, and therefore the image is displayed in the 2D mode.

In the aforementioned light grating unit, by transforming of optical polarization state under function of the microretarder units 504 and 510, switch function of displaying the 3D and the 2D images between two display directions may be achieved. However, structure of the light grating unit and control mechanism thereof is not limited to the aforementioned embodiment, for example, the liquid crystal units 502 or 508 with 45 degree polarization rotation of the light grating unit may also be substituted by the scattering liquid crystal unit of FIG. 4A or FIG. 4B. The 45 degree polarizing film 506 may also be substituted by the 135 degree polarizing film. Moreover, if the initial light polarization state is 90 degrees, by controlling the light grating unit, the grating light source required for 3D displaying may also be achieved.

Figure 9:
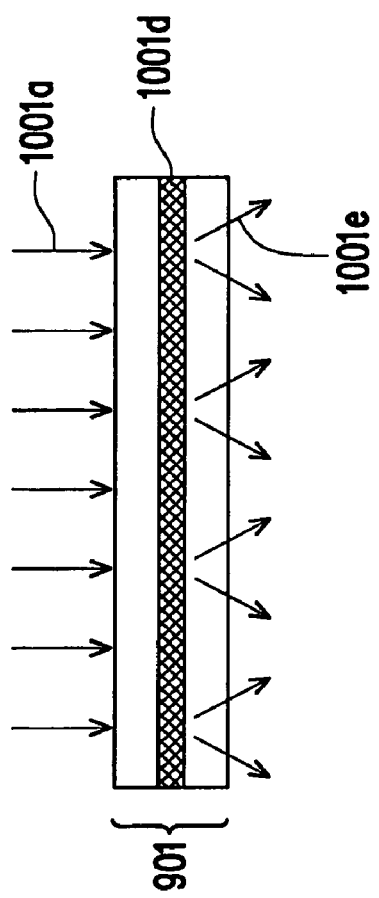
FIG. 9 is a schematic diagram illustrating a structure and function of a scattering liquid crystal unit according to an embodiment of the present invention.

FIG. 9 is a schematic diagram illustrating a structure and function of a scattering liquid crystal unit according to an embodiment of the present invention. Referring to FIG. 9, a scattering liquid crystal module 901 is also a polarized light modulation unit, which is used for modulating polarization of the passing through polarized light. As the aforementioned description of FIG. 4A or FIG. 4B, the scattering liquid crystal unit has the controllable transparent state and the scattering state. A liquid crystal layer 1001d is hold by an upper transparent substrate and a lower transparent substrate. When the scattering liquid crystal unit is set to the transparent state, polarization direction of an incident light 1001a passed through the scattering liquid crystal module 901 is not changed. If the incident light is the polarized light 1001a, polarization feature thereof is maintained. When the scattering liquid crystal unit 1001d is switched to the scattering state, polarization direction of the incident polarized light 1001a is then scattered, and a non polarized light 1001e is then output to form a general light source. The scattering liquid crystal module 901 may be utilized with the microretarder unit and the polarizing film to generate the grating light source.

Figure 10:
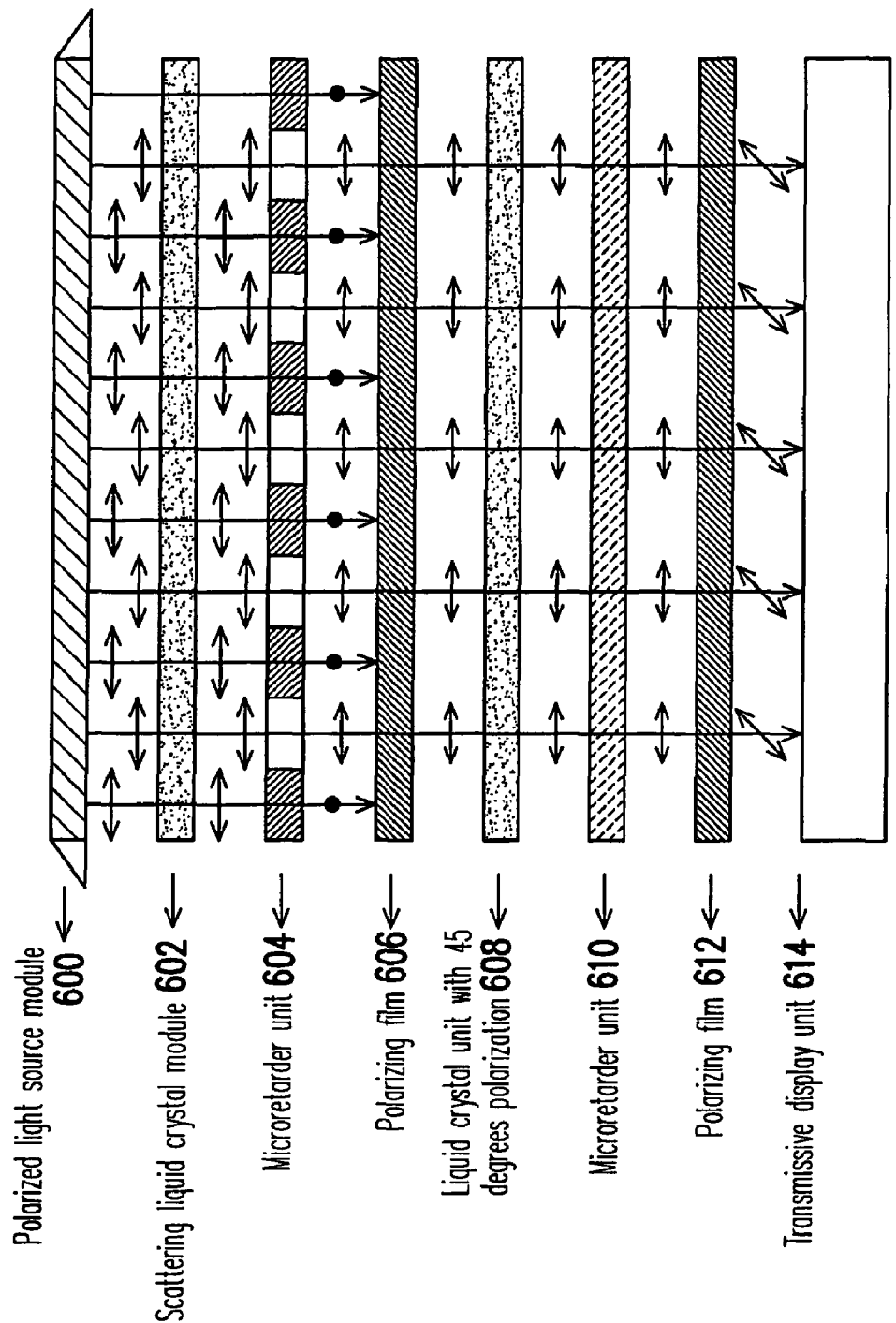
FIGS. 10 and 11 are schematic diagrams in two viewing directions, illustrating another embodiment of the present invention, in which a light grating unit applies a design of a scattering liquid crystal module.
Figure 11:
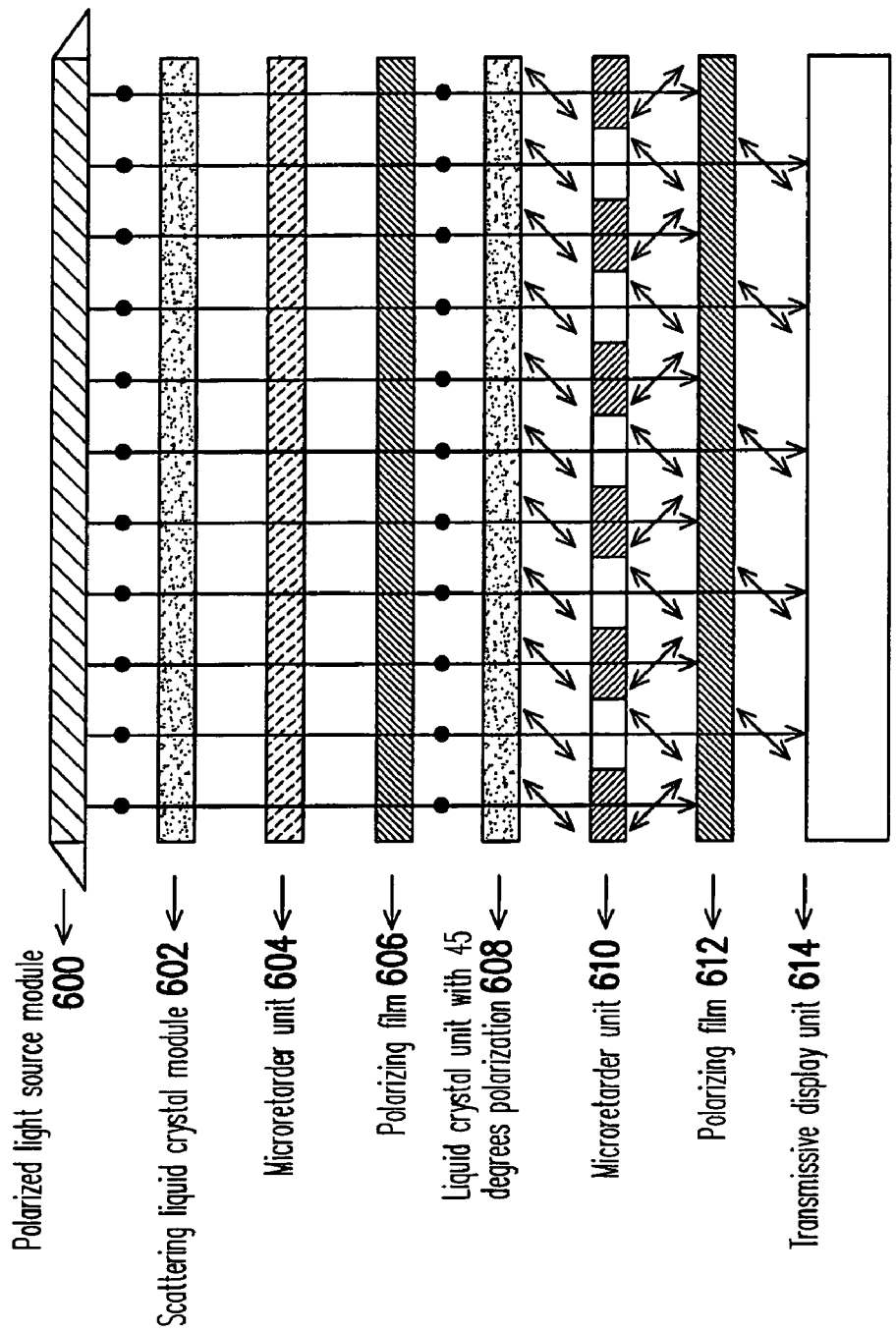

FIGS. 10 and 11 are schematic diagrams in two viewing directions, illustrating another embodiment of the present invention, in which a light grating unit applies a design of a scattering liquid crystal module. FIG. 10 is another embodiment at the horizontal display mode. For example, a polarized light source module 600 generates a polarized light with 0 degree polarization. The polarized light may pass through a scattering liquid crystal module 602 and maintain the polarization state thereof when the scattering liquid crystal module is in the transparent state.

Next, the fast axis (or the slow axis) is disposed at the microretarder unit 604 at 45 degrees. The microretarder unit 604 has different phase different at the horizontal direction. In other words, it has the pattern for the vertical strips with 0 phase and λ/2 phase in alternative change. After the 0-degree polarization light passes the microretarder unit 604, the odd light beam become the 90-degree polarization light and the even light beams remain at 0-degree polarization. Then, after passing the 0-degree polarization film 606, the light beam with 90 degree polarization cannot pass. As a result, a light source with grating is formed. This light source passes the second liquid crystal unit 608 at off state, and the polarization state remains.

Next, the light source passes the second microretarder unit 610, which has the fast axis at o degree. Since the polarization direction of the microretarder unit 610 different from the microretarder unit 604 by 45 degrees, as shown in FIG. 11, the polarization state of the light source remains at 0 degree after passing the microretarder unit 610. However, since the polarizing film 612 is at the 45 degrees, a portion of the light for the light at 0 degree polarization can still pass the polarizing film 612. The grating effect of the light source can still remain the same to enter the transmissive display unit 614. In this situation, the pixels at odd columns display the first image to one eye of the observer; the pixels at even columns display the second image to another eye of the observer, so as to form a stereo image at the horizontal direction.

In FIG. 11, when the same apparatus is operated in vertical display mode, the display mechanism is shown. The polarized light source module 600 generates 0 degree polarization light in the direction perpendicular to the drawing sheet due to viewing from the side. The scattering liquid crystal module 602 is at the scattering state, so that the polarization effect disappears. Even though the microretarder unit 604 has the strips with 0 phase and λ/2 phase in alternative change, the microretarder unit 604 does not produce polarizing effect. Then, the polarizing film 606 polarizes the passing light into the 0 degree polarization state. The second liquid crystal unit 608 is at on state and thereby rotate the polarization direction by 45 degrees at 135 degrees. The strip pattern of the second microretarder unit 610 in this cross-section is seen. The strip with shade is the strip having λ/2 phase and rotates the polarization direction by 90 degrees. The strips of the microretarder unit 610 with white are at 0 phase and let the light pass without change. The 45 degree polarizing film 612 filters the light with the polarization direction at 135 degrees, and produces the grating light source. In this situation, the pixels at odd rows display the first image to one eye of the observer; the pixels at even rows display the second image to another eye of the observer, so as to form a stereo image at the vertical direction.

In other words, in the present invention, by applying two light grating units, the grating light source may be generated in two display directions, and the light source for 2D image display may also be switched.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A stereo image display device, having a switch function between a first display direction and a second display direction, comprising:
   a polarized light source module, for providing a polarized light;
   a first light grating unit, disposed on a light path of the polarized light, wherein when the first light grating unit is activated, the polarized light is modulated to form a first grating light source for outputting light in every two columns in the first display direction, and when the first light grating unit is turned off, all the polarized light substantially passes through;
   a second light grating unit, disposed on the light path of the polarized light, wherein when the second light grating unit is activated, the polarized light is modulated to form a second grating light source for outputting light in every two rows in the second display direction, and when the second light grating unit is turned off, all the polarized light substantially passes through, and when the first light grating unit generates the first grating light source, the second light grating unit is controlled to maintain a state of the first grating light source; and
   an image display unit, displaying a first image at odd columns or rows of pixels and a second image at even columns or rows of pixels based on a light output from the light grating units,
   wherein the first light grating unit comprises:
      a first microretarder unit, having a first phase modulation material and a second phase modulation material respectively arranged in every two columns and distributed in the first display direction, so as to respectively modulate a phase of the polarized light for outputting;
      a first polarizing film, allowing a polarized light with a predetermined polarization state to pass through; and
      a first polarized light modulation unit, disposed between the polarized light source module and the first polarizing film, being switched between a first state and a second state,
      wherein when the first polarized light modulation unit is switched to the first State, the polarized light is allowed to pass through while maintaining an original polarization feature thereof: and when the first polarized light modulation unit is switched to the second state, a polarization state of the polarized light is transformed, and the transformed polarized light is then output,
   wherein the second light grating unit comprises:
      a second microretarder unit, having a third phase modulation material and a fourth phase modulation material respectively arranged in every two columns and distributed in the second display direction, so as to respectively modulate phase of the polarized light for outputting;
      a second polarizing film, allowing a polarized light with a predetermined polarization state to pass through; and
      a second polarized light modulation unit, disposed between the polarized light source module and the second polarizing film, being switched between a first state and a second state,
      wherein when the second polarized light modulation unit is switched to the first state, the polarized light is allowed to pass through while maintaining an original polarization feature thereof; and when the second polarized light modulation unit is switched to the second state, a polarization state of the polarized light is transformed, and the transformed polarized light is then output.

2. The stereo image display device as claimed in claim 1, wherein the first polarized light modulation unit is a scattering liquid crystal unit capable of being switched between a transparent state and a scattering state:
   (a) when the scattering liquid crystal unit is switched to the transparent state, the polarized light is allowed to pass through while maintaining an original polarization feature; and
   (b) when the scattering liquid crystal unit is switched to the scattering state, the polarized light is scattered and transformed to a non-polarized light for outputting.

3. The stereo image display device as claimed in claim 2, wherein a position of the scattering liquid crystal unit is closer to the polarizing film than the microretarder unit.

4. The stereo image display device as claimed in claim 2, wherein a position of the scattering liquid crystal unit is farther away from the polarizing film than the microretarder unit.

5. The stereo image display device as claimed in claim 1, wherein an angle difference between two fast axes of the first microretarder unit and the second microretarder unit is 45 degrees.

6. The stereo image display device as claimed in claim 1, wherein at least one of the first light grating unit and the second light grating unit comprises:
   a uniform microretarder unit, with a stretching direction substantially perpendicular to that of the microretarder unit, and disposed between the polarized light source module and the microretarder unit in each one of the least one of the first light grating unit and the second light grating unit.

7. The stereo image display device as claimed in claim 1, wherein the first display direction is substantially perpendicular to the second display direction.

8. A stereo image display device, having a switch function between a first display direction and a second display direction, comprising:
   a polarized light source module, for providing a polarized light;
   a first light grating unit, disposed on a light path of the polarized light, wherein when the first light grating unit is activated, the polarized light is modulated to form a first grating light source for outputting light in every two columns in the first display direction, and when the first light grating unit is turned off, all the polarized light substantially passes through;
   a second light grating unit, disposed on the light path of the polarized light, wherein when the second light grating unit is activated, the polarized light is modulated to form a second grating light source for outputting light in every two rows in the second display direction, and when the second light grating unit is turned off, all the polarized light substantially passes through, and when the first light grating unit generates the first grating light source, the second light grating unit is controlled to maintain a state of the first grating light source; and an image display unit, displaying a first image at odd columns or rows of pixels and a second image at even columns or rows of pixels based on a light output from the light grating units, wherein the first light grating unit comprises:
a first microretarder unit, having a first phase modulation material and a second phase modulation material respectively arranged in every two columns and distributed in the first display direction, so as to respectively modulate a phase of the polarized light for outputting; and a first polarizing film, allowing a polarized light with a predetermined polarization state to pass through, wherein the second light grating unit comprises:
a second microretarder unit, having a third phase modulation material and a fourth phase modulation material respectively arranged in every two columns and distributed in the second display direction, so as to respectively modulate phase of the polarized light for outputting; and a second polarizing film, allowing a polarized light with a predetermined polarization state to pass through, wherein the first phase modulation material and the second phase modulation material of the first light grating unit are disposed to have a retardation difference there between substantially equal to 90 degrees; and the third phase modulation material and the fourth phase modulation material of the second light grating unit are disposed to have a retardation difference substantially equal to 90 degrees.

9. A stereo image display device, having a switch function between a first display direction and a second display direction, comprising:

a polarized light source module, for providing a polarized light;

a first light grating unit, disposed on a light path of the polarized light, wherein when the first light grating unit is activated, the polarized light is modulated to form a first grating light source for outputting light in every two columns in the first display direction, and when the first light grating unit is turned off, all the polarized light substantially passes through;

a second light grating unit, disposed on the light path of the polarized light, wherein when the second light grating unit is activated, the polarized light is modulated to form a second grating light source for outputting light in every two rows in the second display direction, and when the second light grating unit is turned off, all the polarized light substantially passes through, and when the first light grating unit generates the first grating light source, the second light grating unit is controlled to maintain a state of the first grating light source; and an image display unit, displaying a first image at odd columns or rows of pixels and a second image at even columns or rows of pixels based on a light output from the light grating units, wherein the first light grating unit comprises:
a first liquid crystal unit with 45 degree polarization rotation, in which a polarization state of a passing through light is not changed when the first liquid crystal unit with 45 degree polarization rotation is turned off, and the polarization state of the passing through light is polarized for 45 degrees when the first liquid crystal unit with 45 degree polarization rotation is activated;

a first microretarder unit, having a first phase modulation material and a second phase modulation material respectively arranged in every two columns and retardation difference is half wavelength, and distributed in the first display direction; and a 45 degree polarizing film, wherein the second light grating unit comprises:
a second liquid crystal unit with 45 degree polarization rotation, in which a polarization state of a passing through light is not changed when the second liquid crystal unit with 45 degree polarization rotation is turned off, and the polarization state of the passing through light is polarized for 45 degrees when the second liquid crystal unit with 45 degree polarization rotation is activated;

a second microretarder unit, having a third phase modulation material and a fourth phase modulation material respectively arranged in every two columns and retardation difference is half wavelength, and distributed in the second display direction; and a 90 degree polarizing film.

10. A dual-mode image display device, comprising:
a polarized light source module, for providing a polarized light source;

a display unit, for displaying a 2D first image or a 3D first image corresponding to a first display direction, or displaying a 2D second image or a 3D second image corresponding to a second display direction;

a first light grating unit disposed between the polarized light source module and the display unit, wherein the first light grating unit includes a first liquid crystal plate displaying the 3D first image in the first display direction corresponding to a first state, or displaying the 2D first image corresponding to a second state;

a second light grating unit disposed between the polarized light source module and the display unit, wherein the second light grating unit includes a second liquid crystal plate displaying the 3D second image in the second display direction corresponding to a first state, or displaying the 2D second image corresponding to a second state, and when the first light grating unit is operated for the 3D first image, the second light grating unit is controlled to maintain a light grating light source with a desired state, wherein a polarizing film is disposed at a side where the first light grating unit and the second light grating unit face to the display unit.

11. The dual-mode image display device as claimed in claim 10, wherein the polarized light source module is a polarized light source module of a whole structure, in which the polarized light source module with the polarization state is obtained by applying a polarizing film.

12. The dual-mode image display device as claimed in claim 10, wherein the first and the second liquid crystal plates are in a fixed position without moving.

13. The dual-mode image display device as claimed in claim 10, wherein the first state of the first liquid crystal plate of the first grating unit or the second liquid crystal plate of the second grating unit is the transparent state, and the second state thereof is to rotate an incident polarization state for 45 degrees.

14. A dual-mode image display device, comprising:
a polarized light source module, for providing a polarized light source;

a display unit, for displaying a 2D first image or a 3D first image corresponding to a first display direction, or displaying a 2D second image or a 3D second image corresponding to a second display direction;

a first light grating unit disposed between the polarized light source module and the display unit, wherein the first light grating unit includes a first liquid crystal plate displaying the 3D first image in the first display direction corresponding to a first state, or displaying the 2D first image corresponding to a second state;

a second light grating unit disposed between the polarized light source module and the display unit, wherein the second light grating unit includes a second liquid crystal plate displaying the 3D second image in the second display direction corresponding to a first state, or displaying the 2D second image corresponding to a second state, and when the first light grating unit is operated for the 3D first image, the second light grating unit is controlled to maintain a light grating light source with a desired state, wherein the first light grating unit and the second light grating unit respectively further comprises:

a microretarder unit, having a first area and a second area, wherein when the first liquid crystal plate or the second liquid crystal plate is in the first state, the first area and the second area form a parallax grating, and when the first liquid crystal plate or the second liquid crystal plate is in the second state, the first area and the second area do not form the parallax grating.

15. The dual-mode image display device as claimed in claim 14, wherein the first area and the second area of the microretarder unit have 90 degree retardation difference based on an incident angle of the polarized light, and polarization states of the first and second areas are perpendicular to each other.

16. The dual-mode image display device as claimed in claim 14, wherein an angle difference between two fast axes of the two microretarder units of the first light grating unit and the second light grating unit is 45 degrees.

* * * * *